of Patent: *Jan. 2, 2024

United States Patent
Bassi et al.

(12) United States Patent
(10) Patent No.: US 11,859,033 B2
(45) Date of Patent: *Jan. 2, 2024

(54) MELT-PROCESSIBLE FLUOROPOLYMER

(71) Applicant: SOLVAY SPECIALTY POLYMERS ITALY S.P.A., Bollate (IT)

(72) Inventors: Mattia Bassi, Milan (IT); Alessio Marrani, Lecco (IT); Valeriy Kapelyushko, Alessandria (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 595 days.

This patent is subject to a terminal disclaimer.

(21) Appl. No.: 16/604,869

(22) PCT Filed: Apr. 9, 2018

(86) PCT No.: PCT/EP2018/059000
§ 371 (c)(1),
(2) Date: Oct. 11, 2019

(87) PCT Pub. No.: WO2018/189091
PCT Pub. Date: Oct. 18, 2018

(65) Prior Publication Data
US 2020/0377631 A1  Dec. 3, 2020

(30) Foreign Application Priority Data
Apr. 11, 2017 (EP) .................... 17165867

(51) Int. Cl.
| | | |
|---|---|---|
| C08F 214/26 | (2006.01) | |
| C09D 127/18 | (2006.01) | |
| C08L 27/18 | (2006.01) | |
| F16L 11/04 | (2006.01) | |
| C08F 214/22 | (2006.01) | |
| C08F 2/30 | (2006.01) | |
| C08F 114/26 | (2006.01) | |
| C08J 3/05 | (2006.01) | |
| C08J 5/18 | (2006.01) | |

(52) U.S. Cl.
CPC .......... *C08F 214/262* (2013.01); *C08F 2/30* (2013.01); *C08F 114/26* (2013.01); *C08F 214/22* (2013.01); *C08J 3/05* (2013.01); *C08L 27/18* (2013.01); *C09D 127/18* (2013.01); *F16L 11/04* (2013.01); *C08F 214/222* (2013.01); *C08F 214/26* (2013.01); *C08F 2800/10* (2013.01); *C08J 5/18* (2013.01); *C08L 2201/52* (2013.01); *C08L 2203/18* (2013.01)

(58) Field of Classification Search
CPC combination set(s) only.
See application file for complete search history.

(56) References Cited

U.S. PATENT DOCUMENTS

| | | | |
|---|---|---|---|
| 3,235,537 A * | 2/1966 | Albin ................ | C08F 214/222 526/236 |
| 4,990,283 A | 2/1991 | Visca et al. | |
| 5,498,680 A | 3/1996 | Abusleme et al. | |
| 6,103,843 A | 8/2000 | Abusleme et al. | |
| 8,997,797 B2 | 4/2015 | Kitahara et al. | |
| 10,087,322 B2 * | 10/2018 | Chen ................ | B32B 27/20 |
| 11,066,501 B2 * | 7/2021 | Bassi ................ | C08F 214/262 |

FOREIGN PATENT DOCUMENTS

| | | |
|---|---|---|
| EP | 2412735 A1 | 2/2012 |
| JP | 2004219579 A | 8/2004 |
| WO | 2002000741 A1 | 1/2002 |
| WO | 2010003929 A1 | 1/2010 |
| WO | 2016028582 A1 | 2/2016 |

OTHER PUBLICATIONS

Standard ASTM D1238-04, "Standard Test Method for Melt Flow Rates of Thermoplastics by Extrusion Plastometer", 2004, p. 1-13.
Standard ASTM D3307-08, "Standard Specification for Perfluoroalkoxy (PFA)-Fluorocarbon Resin Molding and Extrusion Materials", 2008, p. 1-5.

* cited by examiner

Primary Examiner — Nicole M. Buie-Hatcher
(74) Attorney, Agent, or Firm — Osha Bergman Watanabe & Burton LLP

(57) ABSTRACT

The present invention pertains to a melt-processible fluoropolymer, to a composition comprising the melt-processible fluoropolymer, to a process for manufacturing the melt-processible fluoropolymer and to uses of the melt-processible fluoropolymer in various applications.

17 Claims, No Drawings

MELT-PROCESSIBLE FLUOROPOLYMER

TECHNICAL FIELD

The present invention pertains to a melt-processible fluoropolymer, to a composition comprising said melt-processible fluoropolymer, to a process for manufacturing said melt-processible fluoropolymer and to uses of said melt-processible fluoropolymer in various applications.

BACKGROUND ART

Pipes made of fluoropolymers having both high mechanical resistance and high chemical resistance, while exhibiting low permeability at high temperatures, are known in the art which are suitable for use in deepwater oil fields.

For instance, U.S. Pat. No. 8,997,797 (DAIKIN INDUSTRIES, LTD.) Jul. 4, 2015 discloses fluoropolymers having a high crystallinity and a high storage modulus at 170° C. which are suitable for the manufacture of riser pipes, said fluoropolymers consisting of copolymerized units derived from tetrafluoroethylene (TFE), vinylidene fluoride (VDF) and an ethylenically unsaturated monomer other than tetrafluoroethylene and vinylidene fluoride. Among these terpolymers, mention is specifically made of (j) terpolymers of TFE and VDF with 0.1 to 5.0% moles of recurring units derived from a (per)fluoroalkyl ethylene monomer (e.g. $CH_2=CH-C_4F_9$; $CH_2=CH-C_6F_{13}$) and (jj) terpolymers of TFE and VDF with 0.1 to 0.8% moles of recurring units derived from a (per)(fluoro)alkyl vinyl ether of formula $CF_2=CF-OR_f^1$, with $R_f^1$ being a $C_{1-3}$ alkyl group of a $C_{1-3}$ fluoroalkyl group.

Nevertheless, fluoropolymers with high values of the storage modulus and/or high values of the tensile modulus at high temperatures disadvantageously have poor thermal stress cracking resistance, and are rather stiff, with very low elongation at break.

There is thus still the need in the art for melt-processible fluoropolymers endowed with good/acceptable mechanical properties at high temperatures which may be easily processed into a pipe suitable for use in various applications, and which are endowed with superior elongation at break and strain hardening, as well as improved stress cracking resistance (i.e. resistance to stress upon exposure to chemically harsh environment).

Incidentally, JP 2004219579 (MITSUBISHI CHEMICAL CORP) May 8, 2004 discloses a plastic optical fiber having a core and one or more layer of clads formed around the outer periphery of the core, wherein the clads is formed of a terpolymer containing a 1 to 30 mass percent vinylidene fluoride unit, a 30 to 85 mass percent tetrafluoroethylene unit, and a 3 to 40 mass percent fluorovinyl compound unit represented by a general formula $CF_2=CF-(OCF_2CF(CF_3))_aO-R_f$, with $R_f$ being possibly a fluoroalkyl group, and a being zero or an integer. Exemplary embodiments thereof are e.g. VDF/TFE/perfluoroethylvinylether (EVE) terpolymers, with an amount of EVE of 6 or 15% wt (corresponding to molar amounts of about 6.7 and 2.7, respectively), VDF/TFE/perfluoromethylvinylether (MVE) terpolymers, with an amount of MVE of 9 or 10% wt (corresponding to molar amounts of about 5.3 and 5.6, respectively). This document is silent regarding mechanical performances of the fluoropolymers used in the clads.

SUMMARY OF INVENTION

It has been now surprisingly found that the fluoropolymer having specifically the composition below detailed advantageously exhibits acceptable tensile strength (e.g. tensile modulus of about 10 MPa or beyond at high temperatures (e.g. 200° C.) to be suitably used in various applications, including for manufacturing pipes for oil & gas applications. Further, the Applicant has found that the said fluoropolymer surprisingly withstand high pressure and high temperature conditions, undergoing significant stress hardening upon plastic deformation, without incurring thermal stress cracking phenomena, while advantageously retaining high chemical resistance in harsh environments.

Also, the Applicant has found that the fluoropolymer of the present invention surprisingly exhibits high strain hardening rates by plastic deformation.

For the purpose of the present invention, by the term "plastic deformation" it is hereby intended to denote permanent and non-reversible deformation of the fluoropolymer.

For the purpose of the present invention, an elastic deformation is distinguished from a plastic deformation. By the term "elastic deformation" it is hereby intended to denote temporary and reversible deformation of the fluoropolymer.

In a first instance, the present invention pertains to a fluoropolymer [polymer (F)] comprising, preferably consisting of:
- from 60% to 80% by moles, preferably from 65% to 78% by moles of recurring units derived from tetrafluoroethylene (TFE),
- from 15% to 35% by moles, preferably from 20% to 30% by moles of recurring units derived from vinylidene fluoride (VDF), and
- from 1% to 5% by moles, preferably from 1.5% to 3.5% by moles of recurring units derived from perfluoropropylvinylether of formula: $CF_2=CF-O-C_3F_7$, wherein the molar amounts of said recurring units are relative to the total moles of recurring units in said polymer (F).

The polymer (F) of the invention is advantageously melt-processible. The term "melt-processible" is hereby intended to denote a fluoropolymer which can be processed by conventional melt-processing techniques.

The polymer (F) of the invention typically has a melting point ($T_m$) comprised between 170° C. and 300° C., preferably between 190° C. and 270° C., even more preferably between 200 and 225° C.

The polymer (F) of the invention advantageously has a melt flow index (MFI), measured at 300° C. under a 5 kg load according to ASTM D 1238 [MFI (300° C./5 kg)], of at least 0.2 g/10 min, preferably at least 0.5 g/10 min and/or of at most 20 g/10 min, preferably at most 15 g/10 min, more preferably at most 10 g/10 min. Excellent results have been obtained with polymers (F) having a MFI (300° C./5 kg) in the range of 0.8 to 8 g/10 min, more preferably of 1 to 6 g/10 min.

The polymer (F) of the invention advantageously has an elongation at break higher than 350%, as measured at 200° C. according to ASTM D 3307 standard method.

The elongation at break is typically a measure of resistance of polymer (F) to changes of shape without crack formation. The elongation at break typically represents the ratio between changed length and initial length after breakage of the test specimen.

The polymer (F) of the invention advantageously has a strain hardening index (SHI), measured according to the following equation:

$$SHI=[\sigma\ (200\%\ \text{strain})-\sigma\ (100\%\ \text{strain})]/[\varepsilon\ (200\%\ \text{strain})-\varepsilon\ (100\%\ \text{strain})]$$

wherein σ represents the applied stress on the material and ε represents the strain, wherein the stress and the strain were measured according to ASTM D 3307 standard method, of at least 2.5 MPa, preferably of at least 3 MPa at a temperature of 23° C.

The strain hardening rate is a measure of the hardening incurred by a material as a consequence of its plastic deformation under stress.

In a second instance, the present invention pertains to a process for manufacturing the polymer (F) of the invention, said process being carried out either by suspension polymerization or by emulsion polymerization, typically in an aqueous polymerization medium.

The polymer (F) of the invention is preferably obtainable by emulsion polymerization in an aqueous polymerization medium.

The polymer (F) of the invention is typically recovered from an aqueous latex obtainable by emulsion polymerization in an aqueous polymerization medium.

In a third instance, the present invention pertains to an aqueous latex comprising at least one polymer (F) of the invention, said polymer (F) comprising, preferably consisting of:
   from 60% to 80% by moles, preferably from 65% to 78% by moles of recurring units derived from tetrafluoroethylene (TFE),
   from 15% to 35% by moles, preferably from 20% to 30% by moles of recurring units derived from vinylidene fluoride (VDF), and
   from 1% to 5% by moles, preferably from 1.5% to 3.5% by moles of recurring units derived from perfluoropropylvinylether of formula:
   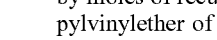
   $CF_2=CF-O-C_3F_7$,
   wherein the molar amounts of said recurring units are relative to the total moles of recurring units in said polymer (F),
   wherein the polymer (F) in the aqueous latex is in the form of primary particles having an average primary particle size of less than 1.00 μm, as measured according to ISO 13321.

The emulsion polymerization is carried out in an aqueous polymerization medium comprising:
   at least one surfactant [surfactant (S)],
   at least one radical initiator,
   optionally, at least one non-functional perfluoropolyether (PFPE) oil, and
   optionally, at least one chain transfer agent.

When the polymer (F) of the invention is manufactured by emulsion polymerization, it is essential to carry out the emulsion polymerization in the presence of at least one surfactant (S).

The aqueous latex typically further comprises at least one surfactant [surfactant (S)].

For the purpose of the present invention, by "surfactant [surfactant (S)]" it is intended to denote an amphiphilic organic compound containing both hydrophobic groups and hydrophilic groups.

The surfactant (S) is typically selected from the group consisting of:
   hydrogenated surfactants [surfactants (H)],
   fluorinated surfactants [surfactants (F)], and
   mixtures thereof.

The surfactant (H) may be an ionic hydrogenated surfactant [surfactant (IS)] or a non-ionic hydrogenated surfactant [surfactant (NS)].

Non-limiting examples of suitable surfactants (IS) include, notably, 3-allyloxy-2-hydroxy-1-propane sulfonic acid salts, polyvinylphosphonic acid salts, polyacrylic acid salts, polyvinyl sulfonic acid salts and alkyl phosphonates.

The surfactant (H) is preferably a surfactant (NS).

Non-limiting examples of suitable surfactants (NS) include, notably, octylphenol ethoxylates and fatty alcohol polyethers comprising recurring units derived from ethylene oxide and/or propylene oxide.

The surfactant (NS) has generally a cloud point of advantageously 50° C. or more, preferably of 55° C. or more, as measured according to EN 1890 standard (method A: 1% by weight water solution).

The surfactant (NS) is preferably selected from the group consisting of non-ionic hydrogenated surfactants commercially available under the trademark names TRIXON® X and PLURONIC®.

According to a first embodiment of the invention, the surfactant (F) may be a cyclic fluorocompound of formula (II):

wherein $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, L is a bond or a divalent group, $R_F$ is a divalent fluorinated $C_1$-$C_3$ bridging group, and Y is an anionic functionality.

In formula (II), the anionic functionality Y is preferably selected from the group consisting of those of formulae:

wherein $X_a$ is H, a monovalent metal (preferably an alkaline metal) or an ammonium group of formula —$N(R'_n)_4$, wherein $R'_n$, equal or different at each occurrence, is a hydrogen atom or a $C_1$-$C_6$ hydrocarbon group (preferably an alkyl group).

Most preferably, the anionic functionality Y is a carboxylate of formula (3″) as defined above.

According to a first variant of this first embodiment of the invention, the surfactant (F) is a cyclic fluorocompound of formula (III):

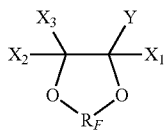

(III)

wherein $X_1$, $X_2$, $X_3$, $R_F$ and Y have the same meaning as defined above.

More preferably, the cyclic fluorocompound of this first variant of this first embodiment of the invention is of formula (IV):

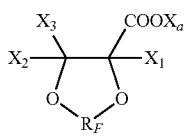

(IV)

wherein $X_1$, $X_2$, $X_3$, $R_F$ and $X_a$ have the same meaning as defined above.

According to a second variant of this first embodiment of the invention, the surfactant (F) is a cyclic fluorocompound of formula (V):

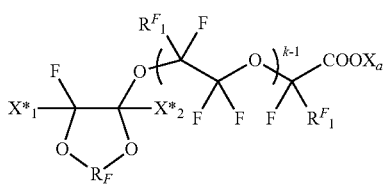

(V)

wherein $R_F$ and X. have the same meanings as defined above, $X_1$, $X^*_2$, equal to or different from each other, are independently a fluorine atom, —$R'_f$ or —$OR'_f$, wherein $R'_f$ is a $C_1$-$C_3$ perfluoroalkyl group, $R^F_1$ is F or $CF_3$, and k is an integer from 1 to 3.

More preferably, the surfactant (F) of this first embodiment of the invention is a cyclic fluorocompound of formula (VI):

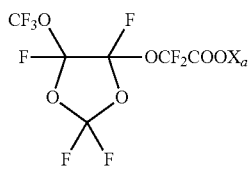

(VI)

wherein X. has the same meaning as defined above and, in particular, with $X_a$ being $NH_4$.

According to a second embodiment of the invention, the surfactant (F) may be a fluorinated surfactant of formula (VII):

(VII)

wherein:

$R_{fS}$ is selected from a $C_4$-$C_{16}$ (per)fluoroalkyl chain, optionally comprising one or more catenary or non-catenary oxygen atoms, and a (per)fluoropolyoxyalkyl chain, —$X^-$ is selected from —COO—, —$PO_3^-$ and —$SO_3$—, $M^+$ is selected from $NH_4^+$ and an alkaline metal ion, and k is 1 or 2.

Non-limiting examples of surfactants (F) according to this second embodiment of invention suitable for use in emulsion polymerization in an aqueous polymerization medium include, notably, the followings:

(a') $CF_3(CF_2)_{n0}COOM'$, wherein no is an integer ranging from 4 to 10, preferably from 5 to 7, preferably no being equal to 6, and M' represents $NH_4$, Na, Li or K, preferably $NH_4$;

(b') T-$(C_3F_6O)_{n1}(CFYO)_{m1}CF_2COOM''$, wherein T represents a Cl atom or a perfluoroalkoxyde group of formula $C_xF_{2x+1-x'}Cl_{x'}Cl_xO$, wherein x is an integer ranging from 1 to 3 and x' is 0 or 1, ni is an integer ranging from 1 to 6, mi is 0 or an integer ranging from 1 to 6, M'' represents $NH_4$, Na, Li or K and Y represents F or —$CF_3$;

(c') F—$(CF_2CF_2)_{n2}$—$CH_2$—$CH_2$—$X^*O_3M'''$, wherein $X^*$ is a phosphorus or a sulphur atom, preferably $X^*$ being a sulphur atom, M''' represents $NH_4$, Na, Li or K and $n_2$ is an integer ranging from 2 to 5, preferably $n_2$ being equal to 3;

(d') A-$R_{bf}$—B bifunctional fluorinated surfactants, wherein A and B, equal to or different from each other, have formula —$(O)_pCFY''$—$COOM^*$, wherein $M^*$ represents $NH_4$, Na, Li or K, preferably $M^*$ representing $NH_4$, Y'' is F or —$CF_3$ and p is 0 or 1, and Rbf is a divalent (per)fluoroalkyl chain or (per)fluoropolyether chain such that the number average molecular weight of A-$R_{bf}$—B is in the range of from 300 to 1800; and (e') mixtures thereof.

The aqueous latex of the invention preferably comprises at least one polymer (F) in the form of primary particles having an average primary particle size comprised between 50 nm and 450 nm, preferably between 250 nm and 300 nm, as measured according to ISO 13321.

For the purpose of the present invention, by "average primary particle size" it is intended to denote the average size of primary particles of polymer (F) obtainable by emulsion polymerization.

For the purpose of the present invention, "primary particles" of polymer (F) are to be intended distinguishable from agglomerates of primary particles.

Aqueous latexes comprising primary particles of polymer (F) are advantageously obtainable by emulsion polymerization in an aqueous polymerization medium. Agglomerates of primary particles of polymer (F) are typically obtainable by recovery and conditioning steps of polymer (F) manufacture such as concentration and/or coagulation of aqueous polymer (F) latexes and subsequent drying and homogenization thereby providing polymer (F) powders.

The aqueous latex of the invention is thus to be intended distinguishable from an aqueous slurry prepared by dispersing polymer (F) powders in an aqueous medium. The average particle size of polymer (F) powders dispersed in an aqueous slurry is typically higher than 1 μm, as measured according to ISO 13321.

The aqueous latex of the invention advantageously has homogeneously dispersed therein primary particles of at least one polymer (F) having an average primary particle size comprised between 50 nm and 450 nm, preferably between 250 nm and 300 nm, as measured according to ISO 13321.

The emulsion polymerization is typically carried out at a pressure comprised between 10 bar and 35 bar, preferably between 11 bar and 25 bar.

The skilled in the art will choose the polymerization temperature having regards, inter alia, of the radical initiator used. The aqueous emulsion polymerization temperature is typically carried out at a temperature comprised between 50° C. and 135° C., preferably between 55° C. and 130° C.

While the choice of the radical initiator is not particularly limited, it is understood that water-soluble radical initiators suitable for aqueous emulsion polymerization are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroylperoxide; 2,2'-azobis (2,4-dimethylvaleronitrile); tert-butylazo-2-cyanobutane; dibenzoylperoxide; tert-butyl-per-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable radical initiators notably include halogenated free radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)-[CF(CF_3)CF_2O]_m-CF(CF_3)-COO\}_2$ where m=0-8, $[ClCF_2(CF_2)_nCOO]_2$, and $[HCF_2(CF_2)_n COO]_2$ where n=0-8; perfluoroalkyl azo compounds such as perfluoroazoisopropane, $[(CF_3)_2CFN=]_2$, $R^{\alpha}N=NR^{\alpha}$, where $R^{\alpha}$ is a linear or branched perfluorocarbon group having 1-8 carbons; stable or hindered perfluoroalkane radicals such as hexafluoropropylene trimer radical, $[(CF_3)_2 CF]_2 (CF_2CF_2)C$. radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as radical initiators to initiate the polymerization process.

Among inorganic radical initiators, ammonium persulfate is particularly preferred.

Among organic radical initiators, the peroxides having a self-accelerating decomposition temperature (SADT) higher than 50° C. are particularly preferred, such as for instance: di-tert-butyl peroxide (DTBP), diterbutylperoxyisopropylcarbonate, terbutyl(2-ethyl-hexyl)peroxycarbonate, terbutylperoxy-3,5,5-trimethylhexanoate.

One or more radical initiators as defined above may be added to the aqueous polymerization medium of the emulsion polymerization process in an amount ranging advantageously from 0.001% to 20% by weight based on the weight of the aqueous polymerization medium.

By "non-functional perfluoropolyether (PFPE) oil" it is hereby intended to denote a perfluoropolyether (PFPE) oil comprising a (per)fluoropolyoxyalkylene chain [chain ($R_f$)] and non-functional end-groups.

The non-functional end groups of the non-functional PFPE oil are generally selected from fluoro(halo)alkyl groups having 1 to 3 carbon atoms, optionally comprising one or more halogen atoms different from fluorine or hydrogen atoms, e.g. $CF_3-$, $C_2F_5-$, $C_3F_6-$, $ClCF_2CF(CF_3)-$, $CF_3CFClCF_2-$, $ClCF_2CF_2-$, $C_1CF_2-$.

The non-functional PFPE oil typically has a number average molecular weight comprised between 400 and 3000, preferably between 600 and 1500.

The non-functional PFPE oil is preferably selected from the group consisting of:

(1') non-functional PFPE oils commercially available from Solvay Solexis S.p.A. under the trademark names GALDEN® and FOMBLIN®, said PFPE oils generally comprising at least one PFPE oil complying with either of formulae here below:

m+n=40-180; m/n=0.5-2

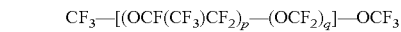

p+q=8-45; p/q=20-1000

(2') non-functional PFPE oils commercially available from Daikin under the trademark name DEMNUM®, said PFPEs generally comprising at least one PFPE complying with formula here below:

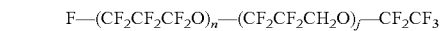

j=0 or integer >0; n+j=10-150

(3') non-functional PFPE oils commercially available from Du Pont de Nemours under the trademark name KRYTOX®, said PFPEs generally comprising at least one low-molecular weight, fluorine end-capped, homopolymer of hexafluoropropylene epoxide complying with formula here below:

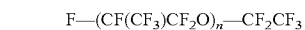

n=10-60

The non-functional PFPE oil is more preferably selected from those having formula (1') as defined above.

The chain transfer agent, if any, is generally selected from those known in the polymerization of fluorinated monomers such as ethane, ketones, esters, ethers or aliphatic alcohols having from 3 to 10 carbon atoms like, e.g., acetone, ethylacetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl) carbonate, bis(isobutyl)carbonate.

The chain transfer agent, if any, may be fed to the aqueous polymerization medium at the beginning, continuously or in discrete amounts (step-wise) during the polymerization, continuous or stepwise feeding being preferred.

Aqueous emulsion polymerization processes as detailed above have been described in the art (see e.g. U.S. Pat. No. 4,990,283 (AUSIMONT S.P.A.) May 2, 1991, U.S. Pat. No. 5,498,680 (AUSIMONT S.P.A.) Dec. 3, 1996 and U.S. Pat. No. 6,103,843 (AUSIMONT S.P.A.) 15/08/2000).

The aqueous latex of the invention preferably comprises from 20% to 30% by weight of at least one polymer (F).

The aqueous latex may be up-concentrated according to any techniques known in the art.

In a fourth instance, the present invention pertains to a composition [composition (C)] comprising at least one polymer (F) of the invention.

The composition (C) of the invention may further comprise one or more additives such as fillers, plasticizers, processing aids and pigments.

In a fifth instance, the present invention pertains to an article comprising at least one polymer (F) or the composition (C) of the invention.

In particular, the present invention pertains to a pipe comprising at least one polymer (F) or the composition (C) of the invention.

By the term "pipe", it is hereby intended to denote a continuous tubular pipe consisting of, or at least comprising, at least one polymer (F) as defined above or a continuous tubular pipe whose inner or outer surface is coated with a tubular layer consisting of, or at least comprising, at least one polymer (F) as defined above.

The pipe of the present invention may be a monolayer pipe or a multilayer pipe.

By the term "monolayer pipe", it is hereby intended to denote a pipe consisting of one tubular layer consisting of, or at least comprising, at least one polymer (F).

By the term "multilayer pipe", it is hereby intended to denote a pipe comprising at least two concentric layers adjacent to each other, wherein at least the inner layer comprises, or preferably consists of, at least one polymer (F).

The polymer (F) of the invention may be advantageously processed into an article such as a pipe or a part thereof by melt-processing techniques such as extrusion or injection moulding.

The polymer (F) of the invention may be advantageously processed by melt-processing techniques at a temperature of at least 250° C., preferably of at least 300° C.

In a sixth instance, the present invention pertains to use of the pipe of the invention in various applications such as oil and gas applications and automotive applications.

According to an embodiment of the present invention, the pipe of the invention may be a flexible riser.

The flexible riser of the invention is particularly suitable for use in oil and gas applications.

In particular, the flexible riser of the invention is particularly suitable for use in upstream applications for conveying hydrocarbons from a bottom platform to a floating off-shore unit.

For the purpose of the present invention, the term "flexible riser" is intended to denote a flexible tubular pipe comprising polymer concentric layers providing sealing against the outer environment and reinforcements made of windings of metal wires or strips or various tapes or sections made of composites providing mechanical resistance under high internal and external pressures.

The flexible riser of the invention may be an unbonded flexible riser or a bonded flexible riser.

By the term "bonded flexible riser", it is hereby intended to denote a flexible riser wherein two or more concentric layers are adhered to each other.

By the term "unbonded flexible riser", it is hereby intended to denote a flexible riser comprising two or more superposed concentric layers, wherein these layers have a certain freedom to move relative to one another.

Should the pipe of the invention be a flexible riser, it is preferably a bonded flexible riser.

According to a first variant of this embodiment of the invention, the flexible riser is a rough-bore flexible riser. By the term "rough-bore flexible riser", it is intended to denote a flexible riser wherein the innermost element is an internal carcass which forms a rough bore owing to gaps between the turns of the carcass that allow it to flex.

The rough-bore flexible riser of this first variant of this embodiment of the invention typically comprises, from the interior towards the exterior:

an internal flexible metal tube, called the internal carcass, formed by a helically wound profiled member with the turns clipped together, an internal polymeric sheath, one or more armor plies wound around the internal polymeric sheath, and an external polymeric sheath, wherein the internal polymeric sheath and/or the external polymeric sheath comprise, preferably consist of, at least one polymer (F) or the composition (C) as defined above.

The internal polymeric sheath is typically coated over the internal carcass of the rough-bore flexible riser so that a continuous tubular layer comprising, preferably consisting of, at least one polymer (F) or the composition (C) as defined above is obtained.

The internal polymeric sheath is preferably extruded over the internal carcass of the rough-bore flexible riser by conventional melt-processing techniques.

According to a second variant of this embodiment of the invention, the flexible riser is a smooth-bore flexible riser. By the term "smooth-bore flexible riser", it is hereby intended to denote a flexible riser which is free from an internal carcass, wherein the innermost element is a smooth-walled impermeable polymeric pipe.

The invention will be now described in more detail with reference to the following examples whose purpose is merely illustrative and not limitative of the scope of the invention.

Raw Materials

A cyclic surfactant of formula (IV) with $X_a$=$NH_4$ was manufactured according to the procedure detailed in WO 2010/003929 (SOLVAY SPECIALTY POLYMERS ITALY SPA) 14/01/2010.

Measurement of the Polymer Composition

The molar amount of the monomers in the polymers was measured through deconvolution of the NMR spectra obtained by solid-state $^{19}F$ Magic Angle Spinning (MAS) NMR using an Agilent DirectDrive2 400 MHz NB spectrometer operating at 376.62 MHz.

Measurement of the Second Melting Temperature

The melting point was determined by differential scanning calorimetry (DSC) according to ASTM D 3418 standard method. The second melting temperature, defined as the endothermic peak observed during the second heating period, was recorded and is hereby referred to as the melting point ($T_m$) of the polymer.

Measurement of the Melt Flow Index (MFI)

The melt flow index was measured according to ASTM D 1238 standard method by applying a weight of 5 Kg at 300° C.

Measurement of the tensile properties

The tensile properties were measured according to ASTM D 3307 standard method on 1.5 mm thick films obtained by compression moulding of the polymers at 320° C.

The elongation at break at 200° C. was measured by pulling the film so obtained with a constant cross-head speed of 1 mm/min during the whole test.

The tensile modulus was measured as the slope of the tensile curves obtained between 0.2% and 1% of elongation with a cross-head speed of 1 mm/min under a specific temperature.

The tensile yield stress was measured as the local maximum of the tensile curve before the necking.

Measurement of the Strain Hardening Index (SHI)

SHI was measured on the polymer films according to the following equation:

SHI=[σ (200% strain)−σ (100% strain)]/[ε(200% strain)−ε (100% strain)]

wherein σ represents the applied stress on the material and ε represents the strain, wherein the stress and the strain were measured according to ASTM D 3307 standard method.

The higher the value of the SHI, the higher the strain hardening rate by plastic deformation and thus the higher the stability of the polymeric film under a specific temperature.

Measurement of the Environmental Stress Resistance (ESR)

The environmental stress resistance was tested using the constant load tensile apparatus described in ISO 22088-2. The resistance was evaluated as the time needed to observe yielding in a sample bar immersed in M15 fuel at room temperature and subjected to a tensile stress equal to 70% of its tensile yield stress in air at the same temperature. ASTM D638 type V specimens of 0.3 mm thickness were used. M15 (or Fuel I as called in ASTM D471), is a fuel-alcohol blend (gasohol) containing 85 vol % of Fuel C (blend of 50/50 vol % Toluene/Isooctane simulating swelling of highly aromatic premium grades of automotive gasoline) with 15 vol % methanol.

EXAMPLE 1

In an AISI 316 steel vertical autoclave, equipped with baffles and a stirrer working at 570 rpm, 3.5 liter of demineralized water were introduced. The temperature was then brought to reaction temperature of 80° C. and the selected amount of 34% w/w aqueous solution of cyclic surfactant of formula (VI) as defined above, with $X_a$=NH$_4$, was added. VDF and ethane were introduced to the selected pressure variation reported in Table 1. A gaseous mixture of TFE-VDF in the molar nominal ratio reported in Table 1 was subsequently added via a compressor until reaching a pressure of 20 bar. Then, the selected amount of a 3% by weight water solution of sodium persulfate (NaPS) as initiator was fed. The polymerization pressure was maintained constant by feeding the above mentioned TFE-VDF while adding the PPVE monomer at regular intervals until reaching the total amount indicated in the table 1.

When 1000 g of the mixture were fed, the reactor was cooled at room temperature, the latex was discharged, frozen for 48 hours and, once unfrozen, the coagulated polymer was washed with demineralized water and dried at 160° C. for 24 hours.

The composition of the obtained polymer F-1, as measured by NMR, was Polymer (F-1)(693/99): TFE (69.6% mol)—VDF (27.3% mol)—PPVE (2.1% mol), having melting point $T_m$=218° C. and MFI=5 g/10'.

EXAMPLE 2

The procedure of example 1 was repeated, by introducing the amount of ingredients indicated in the second column of Table 1.

The composition of the obtained polymer F-2, as measured by NMR, was Polymer (F-1)(693/100): TFE (68% mol)—VDF (29.8% mol)—PPVE (2.2% mol), having melting point $T_m$=219° C. and MFI=1.5 g/10'.

COMPARATIVE EXAMPLE 1

The procedure of example 1 was repeated, by introducing the amount of ingredients indicated in the third column of Table 1.

The composition of the obtained polymer P-1, as measured by NMR, was Polymer (C-1)(693/67): TFE (71% mol)—VDF (28.5% mol)—PPVE (0.5% mol), having melting point $T_m$=249° C. and MFI=5 g/10'.

COMPARATIVE EXAMPLE 2

In an AISI 316 steel horizontal reactor, equipped with a stirrer working at 42 rpm, 56 liter of demineralized water were introduced. The temperature was then brought to reaction temperature of 65° C. and the selected amount of 40% w/w aqueous solution of cyclic surfactant of formula (VI) as defined above, with $X_1$=NH$_4$, was added. VDF and ethane were introduced to the selected pressure variation reported in Table 1.

A gaseous mixture of TFE-VDF in the molar nominal ratio reported in Table 1 was subsequently added via a compressor until reaching a pressure of 20 bar.

Then, the selected amount of a 0.25% by weight water solution of sodium persulfate (NaPS) as initiator was fed. The polymerization pressure was maintained constant by feeding the above mentioned TFE-VDF while adding the PPVE monomer at regular intervals until reaching the total amount indicated in the table 1.

When 16000 g of the mixture were fed, the reactor was cooled at room temperature, the latex was discharged, frozen for 48 hours and, once unfrozen, the coagulated polymer was washed with demineralized water and dried at 160° C. for 24 hours. The composition of the obtained polymer C-2, as measured by NMR, was Polymer (C-2)(SA1100): TFE (70.4% mol)—VDF (29.2% mol)—PPVE (0.4% mol), having melting point $T_m$=232° C. and MFI=8 g/10'.

COMPARATIVE EXAMPLE 3

The procedure of Comparative Example 2 was repeated, by introducing the following changes:
  demineralized water introduced into the reactor: 66 litres;
  polymerization temperature of 80° C.
  polymerization pressure: 12 abs bar
  Initiator solution concentration of 6% by weight
  MVE introduced in the amount indicated in table 1
  Overall amount of monomers mixture fed in the reactor:
    10 000 g, with molar ratio TFE/VDF as indicated in Table 1.

All the amount of ingredients are indicated in the fifth column of Table 1.

The composition of the obtained polymer (C-3), as measured by NMR, was Polymer (C-3)(693/22): TFE (72.1% mol)—VDF (26% mol)—PMVE (1.9% mol), having melting point $T_m$=226° C. and MFI=8 g/10'.

TABLE 1

|  | (F-1) | (F-2) | (C-1) | (C-2) | (C-3) |
| --- | --- | --- | --- | --- | --- |
| Surfactant solution [g] | 50 | 50 | 50 | 740 | 800 |
| Surfactant [g/l] | 4.85 | 4.85 | 4.85 | 5.28 | 4.12 |
| Initiator solution [ml] | 100 | 100 | 100 | 2500 | 600 |
| Initiator [g/kg] | 3.0 | 3.0 | 3.0 | 0.39 | 6.0 |
| VDF [bar] | 1.8 | 1.8 | 0 | 1.8 | 1.8 |
| TFE/VDF mixture [molar ratio] | 70/30 | 70/30 | 70/30 | 70/30 | 69/30[1] |
| FPVE [g] | 122 | 122 | 31 | 660 | 0[2] |
| Ethane [bar] | 0.6 | 0.3 | 0.25 | 2 | 0.1 |

[1]gaseous mixture containing 1% moles of perfluoromethylvinylether (FMVE);
[2]initial partial pressure of FMVE 0.35 bar.

The results regarding polymers (F-1), (F-2) of the invention, and comparative (C-1), (C-2) and (C-3) are set forth in Table 2 here below

TABLE 2

|  | 693/99 (F-1) | 693/100 (F-2) | 693/67 (C-1) | SA1100 (C-2) | 693/14 (C-3) |
|---|---|---|---|---|---|
| Elongation at break [%, 200° C.] | 577 | 739 | 290 | 40 | 35 |
| Tensile modulus [MPa, 23° C.] | 425 | 374 | 484 | 594 | 500 |
| Tensile yield stress [MPa, 23° C.] | 11.6 | 11.4 | 14.0 | 15.5 | 12.5 |
| Tensile modulus [MPa, 170° C.] | 29 | 38 | 56 | 76 | — |
| Tensile modulus [MPa, 200° C.] | 12 | 10 | 48 | 47 | 23 |
| SHI [MPa, 23° C.] | 3.6 | 5.1 | 1.9 | 1.6 | 1.7 |
| ESR as yielding [time, 23° C.] | No Yielding | No Yielding | Yielding after 1 min | Yielding after 1 min | Yielding after 1 min |

In particular, the polymer (F) of the present invention as notably represented by the polymers (F-1), (F-2), surprisingly exhibits a higher elongation at break at 200° C. as compared to the polymers (C-1) and (C-2) of the prior art.

Also, the polymer (F) of the present invention as notably represented by the polymers (F-1), (F-2), despite its lower tensile modulus, which remains nevertheless in a range perfectly acceptable for various fields of use, surprisingly exhibits a higher strain hardening rate by plastic deformation as compared to the polymers (C-1) and (C-2) of the prior art.

Finally, the polymer (F) of the present invention as notably represented by the polymers (F-1) and (F-2) surprisingly exhibits higher environmental stress resistance when immersed in fuels as compared to the polymers (C-1) and (C-2) of the prior art.

Yet, comparison of polymer (F) according to the present invention with performances of polymer (C-3) comprising perfluoromethylvinylether (FMVE) as modifying monomer shows the criticality of selecting perfluoropropylvinylether: indeed, FMVE is shown producing at similar monomer amounts, copolymer possessing too high stiffness, and hence low elongation at break, unsuitable for being used e.g. in O&G applications.

The invention claimed is:

1. A fluoropolymer [polymer (F)] comprising:
   from 60% to 80% by moles of recurring units derived from tetrafluoroethylene (TFE),
   from 15% to 35% by moles of recurring units derived from vinylidene fluoride (VDF), and
   from 1% to 5% by moles of recurring units derived from perfluoropropylvinylether of formula $CF_2=CF-O-C_3F_7$,
   wherein the molar amounts of said recurring units are relative to the total moles of recurring units in said polymer (F).

2. The polymer (F) of claim 1, said polymer (F) having a melting point ($T_m$) comprised between 170° C. and 300° C.

3. The polymer (F) of claim 2, said polymer (F) having a melting point ($T_m$) comprised between 200 and 225° C.

4. The polymer (F) according to claim 1, said polymer having a melt flow index, measured at 300° C. under a 5 kg load according to ASTM D 1238, of at least 0.2 g/10 min and/or of at most 20 g/10 min.

5. The polymer (F) according to claim 4, said polymer having a melt flow index, measured at 300° C. under a 5 kg load according to ASTM D 1238, of at least 0.5 g/10 min and at most 10 g/10 min.

6. The polymer (F) according to claim 1, said polymer (F) having an elongation at break higher than 350%, as measured at 200° C. according to ASTM D 3307 standard method, and/or having a strain hardening index (SHI), measured according to the following equation:

$$SHI=[\sigma\ (200\%\ strain)-\sigma\ (100\%\ strain)]/[\varepsilon\ (200\%\ strain)-\sigma\ (100\%\ strain)]$$

wherein $\sigma$ represents the applied stress on the material and $\varepsilon$ represents the strain, wherein the stress and the strain were measured according to ASTM D 3307 standard method,
of at least 2.5 MPa at a temperature of 23° C.

7. The polymer (F) according to claim 6, said polymer (F) having a strain hardening index (SHI) of at least 3 MPa at a temperature of 23° C.

8. An aqueous latex comprising at least one polymer (F) according to claim 1.

9. The aqueous latex according to claim 8, said aqueous latex further comprising at least one surfactant (S).

10. The aqueous latex according to claim 9, wherein the surfactant (S) is selected from the group consisting of:
    hydrogenated surfactants (H),
    fluorinated surfactants (F), and
    mixtures thereof.

11. A composition (C) comprising at least one polymer (F) according to claim 1.

12. An article comprising at least one polymer (F) according to claim 1.

13. A pipe comprising at least one polymer (F) according to claim 1.

14. The pipe according to claim 13, said pipe being a flexible riser.

15. The flexible riser according to claim 14, said flexible riser being an unbonded flexible riser.

16. The flexible riser according to claim 14, said flexible riser being a bonded flexible riser.

17. The polymer (F) of claim 1, which comprises:
    from 65% to 78% by moles of recurring units derived from tetrafluoroethylene (TFE),
    from 20% to 30% by moles of recurring units derived from vinylidene fluoride (VDF), and
    from 1.5% to 3.5% by moles of recurring units derived from perfluoropropylvinyl-ether of formula $CF_2=CF-O-C_3F_7$,
    wherein the molar amounts of said recurring units are relative to the total moles of recurring units in said polymer (F).

* * * * *